US006506825B1

(12) United States Patent
Flosbach et al.

(10) Patent No.: US 6,506,825 B1
(45) Date of Patent: Jan. 14, 2003

(54) AQUEOUS ELECTROPHORETIC ENAMELS CONTAINING SOLID UREA COMPOUNDS

(75) Inventors: Carmen Flosbach, Wuppertal (DE); Hermann Kerber, Wuppertal (DE); Klaus-Günter Kerlin, Haan (DE); Klausjörg Klein, Wuppertal (DE); Bettina Vogt-Birnbrich, Solingen (DE)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/673,098

(22) PCT Filed: Jun. 7, 1999

(86) PCT No.: PCT/EP99/03997

§ 371 (c)(1),
(2), (4) Date: Dec. 12, 2000

(87) PCT Pub. No.: WO99/64525

PCT Pub. Date: Dec. 16, 1999

(30) Foreign Application Priority Data

Jun. 6, 1998 (DE) .......................................... 198 25 457

(51) Int. Cl.$^7$ .................................................. C08K 3/20
(52) U.S. Cl. ...................................... 524/211; 524/215
(58) Field of Search ................................. 524/211, 215

(56) References Cited

U.S. PATENT DOCUMENTS

| | | | |
|---|---|---|---|
| 4,311,622 A | | 1/1982 | Buter |
| 4,315,840 A | * | 2/1982 | Kempter ...................... 260/18 |
| 4,460,727 A | * | 7/1984 | Shoji .......................... 524/215 |
| 4,481,319 A | * | 11/1984 | Sackmann ................... 524/213 |
| 4,677,028 A | | 6/1987 | Heeringa et al. |
| 4,851,294 A | | 7/1989 | Buter et al. |
| 5,039,759 A | * | 8/1991 | Hoy ........................... 525/437 |
| 5,270,399 A | * | 12/1993 | Czornij ..................... 525/327.6 |

* cited by examiner

Primary Examiner—Edward J. Cain
(74) Attorney, Agent, or Firm—Steven C. Benjamin

(57) ABSTRACT

Use of solid, finely divided urea compounds to prevent edge migration when stoving electrophoretically deposited electrodeposition lacquers, and electrodeposition lacquers with a content of 0.1 to 5 wt. % of urea compound, related to resin solids.

8 Claims, No Drawings

AQUEOUS ELECTROPHORETIC ENAMELS CONTAINING SOLID UREA COMPOUNDS

The invention relates to aqueous electrodeposition lacquers (EDLs). The invention also relates to a process for preventing edge migration when electrophoretically deposited aqueous electrodeposition lacquers are stoved, using solid, finely divided urea compounds.

Electrodeposition lacquers are used in particular to produce anti-corrosive primer layers on metal substrates. They may also be deposited and stoved, for example, onto any electrically conductive substrates as a one-coat top coat, clear lacquer or as a lacquer film which is arranged within a multi-coat lacquering. An EDL film arranged within a multi-coat lacquering may, for example, be a lacquer film with decorative effect which acts as a top coat or to which a clear lacquer film may further be applied.

A problem which arises when lacquering with electrodeposition lacquers is edge migration when an EDL film previously deposited onto an electrically conductive substrate is stoved. The EDL film pulls away from the edge, reducing the film thickness at and/or in the immediate vicinity of the edge. In extreme circumstances the edge is not coated after stoving. While this is perceived as a difference in colour because of the substrate showing through in the region of the edge, in the case of decorative EDL coatings, for example, in the case of anti-corrosive EDL primers the anti-corrosive effect is impaired or lost at and/or in the region of the edge.

Electrodeposition lacquer coating agents with good edge coverage, which contain polymer powders, are known from EP-A-0 433 783. The polymer powders may also, for example, be pulverulent urea/aldehyde resins which are highly crosslinked and have no melting point. Producing the polymer powders and incorporating them into electrodeposition lacquer coating agents is complex and requires a grinding process for example.

The object of the invention is to provide electrodeposition lacquers with low or no edge migration behaviour when the electrophoretically deposited coating films comprising them are stoved, and which may be provided with no special outlay.

It has been shown that this object can be achieved by adding solid, finely divided urea compounds (A) to EDL coating agents.

Until now it has only been known to use urea compounds (A) as sag control agents in solvent-based stoving lacquers (DE-C-27 51 761, EP-A-0 192 304 and EP-A-0 198 519 for example). In no way could it have been expected, however, that the use of such urea compounds (A) is possible in aqueous EDL coating agents and has an effect which reduces edge migration.

The present invention therefore provides electrodeposition lacquer coating agents, which contain in addition to conventional film-forming, self-curing or non-self-curing binders and optionally curing agents, pigments, fillers, conventional lacquer additives and solvents, 0.1 to 5 wt. % of one or more solid, finely divided urea compounds (A), which are addition products comprising aromatic, araliphatic, cycloaliphatic or aliphatic diisocyanates and/or polyisocyanates derived therefrom and mono and/or polyamines with primary and/or secondary amino groups, related to the resin solids content of the EDL coating agents.

The invention further provides a process for preventing edge migration when staving electrophoretically deposited aqueous electrodeposition lacquers, which is characterized in that one or more solid, finely divided urea compounds are added to the electrodeposition lacquers in a quantity from 0.1 to 5 wt. % related to the resin solids content, before deposition onto a conductive substrate.

The invention further provides the use of solid, finely divided urea compounds as additives in aqueous electrodeposition lacquers.

The urea compounds are preferably added as additives which prevent edge migration in a quantity from 0.3 to 3, particularly preferably 0.5 to 2 wt. %, related to the resin solids.

The electrodeposition lacquers according to the invention are aqueous coating agents with 10 to 30 wt. % solids for example. They may be electrodeposition lacquers which can be deposited anodically or cathodically. The solids of the electrodeposition lacquers according to the invention are formed by the resin solids, pigments, fillers, further conventional lacquer additives and the content of solid, finely divided urea compounds (A) which is essential to the invention. The resin solids of the EDL coating agents according to the invention are composed of the binder or binders and curing resin(s) they optionally contain. Pigment paste resins (paste resins) which the EDL coating agents according to the invention optionally contain are counted among the binders. At least a portion of the binders has ionic substituents and/or substituents which can be converted into ionic groups. The binders may be self-curing or non-self-curing, in the latter case they have groups capable of chemical curing and the EDL coating agents according to the invention then contain curing agents. The curing agents may have ionic groups also.

The EDL coating agents according to the invention contain binders (EDL binders) having ionic substituents and/or substituents which may be converted into ionic groups, also called ionic binders below. In addition to these the EDL coating agents according to the invention may also contain binders free of ionic groups and/or groups which can be converted into ionic groups, called non-ionic binders below, in a quantity from 0 to 25 wt. %, for example, related to the sum of ionic and non-ionic binders which adds up to 100 wt. %, related in each case to the binder solids (comprising binders and paste resin but not the curing agent content).

The ionic binders' ionic groups or groups which can be converted into ionic groups may be anionic groups or groups which can be converted into anionic groups, e.g. acid groups, such as —COOH, —$SO_3H$ and/or —$PO_3H_2$ and the corresponding anionic groups neutralized with bases. The ionic groups may, however, also be cationic groups or groups which can be converted into cationic groups, e.g. basic groups, preferably basic groups containing nitrogen; these groups may be present in quaternized form or they are converted into cationic groups with a conventional neutralizing agent, e.g. an organic monocarboxylic acid, such as formic acid or acetic acid for example. Examples are amino, ammonium, e.g. quaternary ammonium, phosphonium and/or sulfonium groups. Amino groups present may be primary, secondary and/or tertiary. The groups which can be converted into ionic groups may be present in partially or wholly neutralized form.

The ionic binders have functional groups capable of chemical curing, particularly hydroxyl groups, corresponding, for example, to a hydroxyl value from 30 to 300, preferably 50 to 250 mg KOH/g.

The EDL coating agents according to the invention may be per se known EDL coating agents which can be deposited anodically (ADLs). These contain binders which can be deposited anodically, based, for example, on polyesters, epoxy resin esters, (meth)acrylic copolymer resins, maleate oils or polybutadiene oils with a weight average molecular weight (Mw) from 300 to 10000 for example and an acid value from 35 to 300 mg KOH/g. The binders have COOH, $SO_3H$ and/or $PO_3H_2$ groups. The resins may be converted into the aqueous phase after neutralization of at least a portion of the acid groups. The binders may be self-curing or non-self-curing. The ADL coating agents may therefore also contain conventional curing agents, e.g. triazine resins, curing agents which contain groups capable of, transesterification or blocked polyisocyanates.

In the case of EDL coating agents according to the invention used as anti-corrosive primer in particular, they are preferably per se known EDL coating agents which can be deposited cathodically (CDLs). These contain binders which can be deposited cathodically such as resins containing primary, secondary and/or tertiary amino groups, the amine values of which are 20 to 250 mg KOH/g for example. The weight average molecular weight (Mw) of these CDL binders is preferably 300 to 10000. The resins may be converted into the aqueous phase after quaternization or neutralization of at least a portion of the basic groups. Examples of such CDL binders are amino epoxy resins, amino epoxy resins with terminal double bonds, amino epoxy resins with primary OH groups, amino polyurethane resins, polybutadiene resins containing amino groups and/or modified epoxy resin/carbon dioxide/amine conversion products as well as amino(meth)acrylate resins. The CDL binders may be self-curing or they are used in a mixture with known curing agents. Examples of such curing agents are amino resins, blocked polyisocyanates, curing agents with terminal double bonds, polyepoxy compounds or curing agents which contain groups capable of transesterification.

The ionic binders may be used to produce the EDL coating agents according to the invention as EDL binder dispersion which may optionally contain non-ionic binders and/or curing agents. EDL binder dispersions may be produced by synthesis of EDL binders in the presence or absence of organic solvents and conversion into an aqueous dispersion by diluting the EDL binders neutralized with neutralizing agent with water. The EDL binder(s) may be present in a mixture with one or more suitable curing agents and/or one or more non-ionic binders and be converted into the aqueous dispersion together with them. Where present, organic solvent may be removed down to the desired content, by distillation in vacuo for example, before or after conversion into the aqueous dispersion. Subsequent removal of solvents may be avoided, for example, if the EDL binders present optionally in a mixture with curing agents and/or non-ionic binders are neutralized in the low-solvent or solventless state, e.g. as solventless melt, with neutralizing agents at temperatures of up to 140° C. for example and then converted into the EDL binder dispersion with water. It is also possible to avoid removing organic solvents if the EDL binders are presented as solution in one or more radically polymerizable, olefinically unsaturated monomers or the binder synthesis is carried out in one or more radically polymerizable monomers (e.g. styrene) as solvent, after which conversion into an aqueous dispersion takes place by neutralization with neutralizing agent and dilution with water and the radically polymerizable monomers are then polymerized out.

As mentioned above, both ADL coating agents according to the invention and CDL coating agents according to the invention may contain non-ionic binders. Examples of non-ionic binders are (meth)acrylic copolymer resins, polyester resins, polyurethane resins. The term (meth)acrylic is synonymous with acrylic and/or methacrylic. The non-ionic binders preferably have functional groups, particularly curable functional groups. Particularly preferably they are the same curable functional groups as the ionic binders of the EDL coating agents according to the invention also contain. Preferred examples of such functional groups are hydroxyl groups. Accordingly the non-ionic binders are preferably polymer polyols.

The polymer polyols are preferably polymer polyols selected from hydroxy-functional polyesters, polyurethanes and/or (meth)acrylic copolymers. The polymer polyols have at least two hydroxyl functions in the molecule, corresponding to a hydroxyl value from 30 to 350 mg KOH/g for example. The polymer polyols preferably contain no further functional groups in addition to the hydroxyl groups. The polymer polyols have a number average molecular weight (Mn) from 500 to 10000 and a hydroxyl value from 30 to 350 mg KOH/g for example.

Examples of polymer polyols are hydroxyfunctional polyester or polyurethane resins, such as those with a number average molecular weight (Mn) from 500 to 5000, preferably from 1000 to 3000 and hydroxyl values from 30 to 350, preferably from 50 to 280 mg KOH/g or hydroxyfunctional (meth)acrylic copolymers, such as those with a number average molecular weight (Mn) between 1000 and 10000 and hydroxyl values from 30 to 300, preferably from 50 to 250 mg KOH/g.

Related to their resin solids, the EDL coating agents according to the invention contain 0.1 to 5, preferably 0.3 to 3, particularly preferably 0.5 to 2 wt. % of one or more solid, finely divided urea compounds (A) as additives which prevent edge migration.

The urea compounds (A) are organic urea compounds, viz. addition products comprising aromatic, araliphatic, cycloaliphatic or aliphatic diisocyanates and/or polyisocyanates derived therefrom (such as those of the isocyanurate type for example) and mono and/or polyamines with primary and/or secondary amino groups. The addition products may be low-molecular compounds defined by the empirical formula or oligomeric or polymeric addition products. Preferred urea compounds (A) are those in which polyisocyanate and amine have been converted in a stoichiometric ratio of 0.7 to 1.5 primary and/or secondary amino groups per isocyanate group, particularly preferably in a stoichiometric ratio of amino groups to isocyanate groups of 1:1. Addition products comprising diisocyanates, preferably comprising aliphatic or cycloaliphatic diisocyanates and primary amines, preferably primary monoamines, are particularly preferably used as urea compounds (A). Preferably the aliphatic or cycloaliphatic diisocyanates are symmetrically constructed diisocyanates.

The urea compounds (A) used in the EDL coating agents according to the invention are preferably selected in such a way that they are solid, particularly preferably crystalline substances, as these exhibit the highest effectiveness against edge migration. The solid urea compounds (A) are present in the EDL coating agents according to the invention in finely divided form, the particle sizes of the (A) particles are preferably 0.1 to 20 μm. Preferably the solid or crystalline urea compounds (A) have a high solidification or melting point, below to above the stoving temperatures prevailing when the EDL coating agents according to the invention are stoved for example, particularly between 80 and 250° C. for example. Particularly preferably the adduct formed from 1 mole of 1,6-hexane diisocyanate and 2 moles of benzyl amine is used as urea compound (A) in the EDL coating agents according to the invention.

Examples of urea compounds (A) which may be used according to the invention are those which are described as sag control agents in solvent-based stoving lacquers in DE-C-27 51 761, EP-A-0 192 304 and EP-A-0 198 519, to which express reference is made herein.

The urea compounds (A) may be produced in conventional manner by addition of amines with primary and/or secondary amino groups to polyisocyanates. Amine can be added to the polyisocyanate or polyisocyanate to the amine, or the reactants are added simultaneously; adding the polyisocyanate to the amine is preferred. They are produced in the absence of water at temperatures between 20 and 80° C. for example, solventless in substance for example, preferably in an inert solvent or particularly preferably in the presence of binder or curing agent which is inert in the reaction conditions, an inert binder or curing agent solution for example. Thorough mixing of the reaction systems, for example by vigorous stirring, using a dissolver or by conducting the addition reaction in and/or using a rotor/stator unit is advisable. If production according to the particularly preferred method is to be carried out in the presence of inert binder or curing agent, this may take place in the presence of a portion of all of the binder(s) or curing agent(s) present in the EDL coating agents according to the invention. These may be the ionic, optionally already neutralized binders mentioned above, non-ionic binders, curing agents or any mixtures of these components. If the EDL coating agent according to the invention contains more than one binder and/or more than one curing agent, for example, production may take place in one of these binders or in one of these curing agents for example. The essential point is that the binders or curing agents which are used as reaction medium for the production of the urea compounds (A) are inert with respect to the reactants, i.e. preferably do not react either with the amine or the polyisocyanate in the prevailing production conditions or their reactivity with respect to these reactants is so low that the reactants react in practice only with each other, i.e. react completely to produce the desired urea compound (A). The procedure is preferably such that the formed urea compounds (A) in the binder and/or the binder solution and/or the curing agent and/or the curing agent solution precipitate or crystallize out as finely divided solid, during or after the addition reaction for example, on or after cooling for example. Such dispersions of urea compounds (A) present as finely divided solid, preferably crystalline solid may also be produced by melting and fine dispersion of the urea compounds (A) in the binder (solution) and/or curing agent (solution) followed by cooling below the solidification or melting point of the urea compounds (A). This procedure is appropriate, for example, when binder (solutions) or curing agent (solutions) which are not inert in the sense outlined above are to be used.

Non-aqueous dispersions of solid, finely divided urea compounds (A) produced in this way for example may be used, preferably as dispersion in organically dissolved binder and/or curing agent, with an (A) content from 0.5 to 10, particularly between 1 and 10 wt. %, for example, related to the binder and/or curing agent solids content. Examples of organic solvents which the non-aqueous dispersions of the solid, finely divided urea compounds (A) may contain are glycol ethers such as butyl glycol, butyl diglycol, dipropylene glycol dimethylether, ethylene glycol dimethylether; glycol ether esters such as ethyl glycol acetate, butyl glycol acetate, butyl diglycol acetate, methoxypropyl acetate; esters such as butyl acetate; ketones such as methyl ethyl ketone, methyl isobutyl ketone; alcohols such as propanol, butanol; aromatic hydrocarbons such as xylene, Solvesso 100 (registered trademark for a mixture of aromatic hydrocarbons with a boiling range from 155 to 185° C.) and aliphatic hydrocarbons. The urea compounds (A) may be used for example in the form of such dispersions in the production of the EDL coating agents according to the invention. As explained in greater detail below, when producing the EDL coating agents according to the invention the urea compounds (A) may be added at the outset or, however, also subsequently directly at the time of use for electrodeposition lacquering.

The EDL coating agents according to the invention may contain pigments, fillers, solvents and/or conventional lacquer additives in addition to the binder or binders, water and the content essential to the invention of urea compounds (A) as additives which prevent edge migration and optionally present curing agent.

Examples of pigments are the conventional inorganic and/or organic coloured pigments and/or special effect pigments such as titanium dioxide, iron oxide pigments, carbon black, phthalocyanine pigments, quinacridone pigments, metal pigments, comprising titanium, aluminium or copper for example, interference pigments such as titanium dioxide-coated aluminium, coated mica, graphite effect pigments, platelet-like iron oxide, platelet-like copper phthalocyanine pigments. Examples of fillers are kaolin, talcum or silicon dioxide. The EDL coating agents according to the invention may also contain anti-corrosive pigments. Examples thereof are zinc phosphate or organic corrosion inhibitors. The type and quantity of the pigments depends on the proposed application of the EDL coating agents according to the invention. If clear coatings are to be obtained, then no, or only transparent, pigments, such as e.g. micronized titanium dioxide or silicon dioxide are used. If opaque coatings are to be obtained, then the EDL bath preferably contains colouring pigments.

The pigments and/or fillers may be dispersed in a portion of the binder and then be ground in a suitable unit, e.g. a pearl mill, after which completion takes place by mixing with the remaining binder content. After addition of neutralizing agent—if this has not already taken place—the EDL coating agent and/or bath may then be produced from this material by dilution with water (one-component method).

Pigmented EDL coating agents and/or baths according to the invention may, however, also be produced by mixing an EDL binder dispersion and a separately produced pigment paste (two-component method). For this purpose an EDL binder dispersion is further diluted with water for example and an aqueous pigment paste then added. Aqueous pigment pastes are produced by methods known to the person skilled in the art, preferably by dispersing the pigments and/or fillers in paste resins conventional for these purposes. Such paste resins are familiar to the skilled person. Examples of paste resins which can be used in CDL baths are described in EP-A-0 183 025 and EP-A-0 469 497.

The pigment plus filler/binder plus curing agent weight ratio of the EDL coating agents according to the invention is from 0:1 to 0.8:1 for example, for pigmented lacquers it is preferably between 0.05:1 and 0.4:1.

In addition to the urea compounds (A) contained in the EDL coating agents according to the invention as additives which prevent edge migration, the EDL coating agents according to the invention may optionally contain further additives, in quantities from 0.1 to 5 wt. % for example, related to the resin solids. In particular these are those which are known for EDL coating agents, such as wetting agents, neutralizing agents, flow promoters, catalysts, corrosion inhibitors, foam inhibitors, light stabilizers, anti-oxidants as well as conventional anti-cratering additives. The additives may be incorporated into the EDL coating agents according to the invention in any way, e.g. during binder synthesis, during the production of EDL binder dispersions, via a pigment paste or also separately.

The EDL coating agents according to the invention may also contain conventional solvents in the contents conventional for EDL coating agents. Examples of such solvents which are conventional for EDL coating agents are glycol ethers, such as butyl glycol and ethoxy propanol and alcohols such as butanol. The solvents may be incorporated into the EDL coating agents according to the invention by different means, as a constituent of binder or curing agent solutions, via an EDL binder dispersion, as a constituent of a pigment paste or by being added separately for example. The solvent content of the EDL coating agents according to the invention is from 0 to 5 wt. % for example, related to coatable EDL bath.

The EDL coating agents according to the invention may be prepared by the known methods for producing EDL baths, i.e. in principle by means of both the one-component method and the two-component method described above.

The EDL coating agents according to the invention are preferably produced in that the urea compounds (A) as described above are mixed with the remaining constituents of the EDL coating agent as a dispersion of solid, fine particles in a solvent or particularly preferably as a dispersion in liquid or dissolved binder and/or curing agent, for example in a portion of the liquid or dissolved binder and/or curing agent. Mixing initially takes place with the remaining binder, for example, before the further constituents are mixed in. If the EDL coating agents according to the invention contain more than one binder, then it is possible for the urea compounds (A) to be present in a binder whose functional, particularly curable functional groups differ from the functional groups of the further binder or binders to be mixed therewith. It is, however, preferred that the functional, particularly curable functional groups of the binders are identical if the EDL coating agents according to the invention contain more than one binder. Preferred examples of such identical functional groups are hydroxyl groups.

When producing EDL coating agents according to the invention by the one-component method for example, the procedure may be such that the urea compounds (A) are present in finely divided form in the presence of the constituents of the EDL coating agent which are present in non-aqueous phase and are converted into the aqueous phase jointly therewith by dilution with water. For example, pigments and/or fillers may be dispersed in a portion of the binder and/or curing agent and then be ground in a suitable unit, e.g. a pearl mill, after which completion takes place by mixing with the remaining content of binder and/or curing agent which contains solid urea compounds (A) dispersed in finely divided form. Grinding of the (A) particles may preferably be avoided by this means. After addition of neutralizing agent—if this has not already taken place —the EDL coating agent and/or bath may then be produced from this material by dilution with water.

When producing EDL coating agents according to the invention by the two-component method, for example, in contrast the procedure may be such that the solid urea compounds (A) are present in finely divided form in the presence of the ionic binders present in non-aqueous phase and are converted into the aqueous phase jointly therewith by dilution with water—after addition of neutralizing agent if this has not already taken place. An EDL binder dispersion containing the solid, finely divided urea compounds (A) is obtained in this way. A pigmented EDL coating agent and/or bath according to the invention may then be produced from an EDL binder dispersion obtained in this way by mixing with a separate pigment paste. Alternatively, when using the two-component method the procedure may also be such that an aqueous pigment paste containing (A) particles is added to an EDL binder dispersion. The pigment paste may be produced, for example, by mixing or emulsifying binder and/or curing agent containing solid urea compounds (A) dispersed in finely divided form with a pigment paste previously produced by dispersing pigments and/or fillers in aqueous paste resin. Grinding of the (A) particles may be avoided in both alternatives of the two-component method.

The urea compounds may also be added to the EDL coating agents according to the invention separately. It is, for example, also possible to make the separate addition subsequently, as a corrective additive to EDL baths which are ready for coating, for example. The urea compounds are converted into a water-thinnable form for this purpose; for example the separate, particularly subsequent addition may be as a constituent of an aqueous pigment paste produced separately for example, or the urea compounds (A) may be added by means of a water-thinnable binder, particularly as a constituent of an EDL binder dispersion or in an aqueous EDL paste resin or with the aid of suitable emulsifiers, according to the principles described in the previous paragraph for example.

The EDL coating agents according to the invention may be applied to different substrates which are or have been rendered electrically conductive, particularly metal substrates, by electrodeposition as part of a one-coat or multi-coat lacquering, and stoved. The EDL coating agents according to the invention are particularly suitable in the automotive sector, for the anti-corrosive priming of motor vehicle bodies or motor vehicle body components for example. These primers may optionally be provided with further lacquer films. The EDL coating agents according to the invention may, however, also be deposited and stoved, for example as top coat lacquer, clear lacquer or as a lacquer film which is arranged within a multi-coat lacquering and may have a decorative function.

Surprisingly, the EDL coating agents according to the invention exhibit a distinctly reduced or no edge migration behaviour when the EDL coating films deposited from them are stoved.

EXAMPLE 1

Production of Bismuth Lactate 901 parts of a 70 wt. % solution of lactic acid in water are heated to 70° C. 466 parts of conventional commercial bismuth oxide ($Bi_2O_3$) are added in portions accompanied by stirring. After a further 6 hours' stirring at 70° C. the mix is cooled to 20° C. and left for 12 hours without stirring. Finally the precipitate is filtered off, washed with a little water and ethanol and dried at 50° C.

EXAMPLE 2

Production of a CDL Dispersion a) 832 parts of the monocarbonate of an epoxy resin based on bisphenol A (commercial product Epikote 828) are mixed with 830 parts of a conventional commercial polycaprolactone polyol (commercial product CAPA 205) and 712 parts of diglycol dimethylether and caused to react with 0.3% of BF₃ etherate at 70 to 140° C. until an epoxy value of 0 is obtained. 307 parts of a conversion product comprising 174 parts of toluylene diisocyanate (2 NCO equivalents) with 137 parts of 2-ethylhexanol with an NCO content of 12.8% are added as catalyst to this product (70% solids, 2 carbonate equivalents) at 40 to 80° C. in the presence of 0.3% Zn-acetylacetonate. Conversion proceeds until the NCO value is 0 and 70% solids are then set with diglycol dimethylether.

b) 618 parts of a conversion product comprising 348 parts of toluylene diisocyanate (80% 2,4-isomer; 20% 2,6-isomer) with 274 parts of 2-ethylhexanol with a residual NCO content of 12.8% are slowly added to 1759 parts of a biscarbonate of an epoxy resin based on bisphenol A (commercial product Epicote 1001) at 60 to 80° C. The reaction is continued until the NCO value is 0 is and then set to 70% solids with diglycol dimethylether.

c) 622 parts of the conversion product comprising 137 parts of 2-ethylhexanol with 174 parts of toluylene diisocyanate are added to 860 parts of bishexamethylene triamine dissolved in 2315 parts of methoxypropanol at a temperature of 30° C. (NCO content 12.8%) and converted until the NCO content is 0. 4737 parts of conversion product b) and 3246 parts of reaction product a) (both 70% in diglycol dimethylether) are then added and reacted at 60 to 90° C. The reaction is terminated at an amine value of 32 mg KOH/g. The product produced is distilled off in vacuo to a solids content of 85%.

d) Neutralization takes place with 30 mmoles of formic acid/100 g of resin. Heating to 70° C. then takes place and bismuth lactate is added in portions accompanied by stirring in a quantity such that 1 wt. % of bismuth is present, related to the solids content in the batch. Stirring continues for a further 6 hours at 60° C. and the batch is then cooled. A suspension of a diurea derivative (addition product of 2 moles of benzyl amine to 1 mole of hexamethylene diisocyanate) produced in the solution of an acrylate resin (monomer weight ratio: 2.5% acrylic acid, 24% hydroxyethyl methacrylate, 43% styrene, 30.5% ethylhexyl methacrylate; number average molecular weight ($M_n$)=2500) in an 8:1 mixture of Solvesso 100 and n-butanol with a solids content of 55 wt. % (51 wt. % resin solids content and 4 wt. % diurea derivative content) is added in a quantity such that 1 wt. % of diurea derivative is present, related to the solids content in the batch. Conversion into a dispersion with a solids content of 40 wt. % takes place with deionized water.

EXAMPLE 3

Production of a CDL Dispersion

Example 2 is repeated with the difference that in step d), instead of the acrylate resin solution containing suspended diurea derivative, the same quantity of the same acrylate resin solution but containing no diurea derivative (resin solids content 51 wt. %) is added.

EXAMPLE 4

Production of a Pigment Paste

Using a high-speed mixer, 15 parts of acetic acid (50%), 30 parts of a conventional commercial wetting agent (50%) and 350 parts of deionized water are added to 223 parts of the paste resin according to EP-A-0 469 497 A1 Example 1 (55%). 12.3 parts of carbon black and 430 parts of titanium dioxide are added thereto. A solids content of 53 wt. % is set with deionized water and the mixture is ground in a pearl mill. A stable pigment paste is produced.

EXAMPLE 5a

Production of a CDL Bath and Coating, According to the Invention

A CDL bath with a solids content of 20 wt. % and a pigment/binder weight ratio of 0.5:1 is produced in conventional manner by mixing the CDL dispersion from Example 2, deionized water and addition of the pigment paste from Example 4 accompanied by thorough stirring. From the CDL bath adjusted to an acid content of 35 milliequivalents/100 g of solids with formic acid, perforated sheets comprising conventional phosphated body steel are cataphoretically coated in a 20 μm dry film thickness and stoved for 30 minutes at 180° C. The sheets coated in this way were subjected to a 480-hour salt spray test to DIN 53167. There was 60% corrosive attack at the edges of the perforations.

EXAMPLE 5b

Comparison

Example 5a is repeated with the difference that the CDL dispersion from Example 3 is used instead of the CDL dispersion from Example 2. There was 80% corrosive attack at the edges of the perforations.

What is claimed is:

1. An aqueous electrodeposition lacquer coating agent having 10–30 wt. % solids content, comprising a conventional film forming binder comprising resin selected from the group consisting of self-curing binders and non-self-curing binders and optionally curing agents, pigment, fillers, conventional lacquer additives and solvents, and 0.1 to 5 wt. %, based on the resin solids content of the coating agent, of at least one solid, finely divided urea compound having a high melting point of 80–250° C., said urea compound consisting of the addition product of (a) at least one isocyanate selected from the group consisting of aromatic diisocyanates, araliphatic diisocyanates, cycloaliphatic diisocyanates, aliphatic diisocyanates and polyisocyanates derived there from and (b) at least one amine selected from the group consisting of primary monoamines, secondary monoamines, polyamines with primary amino groups, polyamines with secondary amino groups and polyamines with primary and secondary amino groups.

2. The aqueous electrodeposition lacquer coating agent of claim 1 wherein the solid urea compounds are crystalline and have a particle size of 0.1 to 20 μm.

3. The aqueous electrodeposition lacquer coating agent of claim 2 wherein the solid urea compounds are formed from amines and isocyanates in a stoichiometric ratio of amine groups to isocyanate groups of 0.7 to 1 to 1.5 to 1.0.

4. The aqueous electrodeposition lacquer coating agent of claim 2 wherein the solid urea compound is an adduct of 1 mole of 1,6-hexane diisocyanate and 2 moles of benzyl amine.

5. A process comprising the electrophoretic deposition of a layer of the aqueous electrodeposition lacquer of claim 1 on a conductive substrate and curing the layer at an elevated temperature whereby the edge migration of the layer is prevented by the presence of the finely divided solid urea compound.

6. The process of claim 5 wherein the solid urea compounds are crystalline and have a particle size of 0.1 to 20 μm.

7. The process of claim 6 wherein the solid urea compounds are formed from amines and isocyanates in a stoichiometric ratio of amine groups to isocyanate groups of 0.7 to 1 to 1.5 to 1.0.

8. The process of claim 7 wherein the solid urea compound is an adduct of 1 mole of 1,6-hexane diisocyanate and 2 moles of benzyl amine.

* * * * *